(12) United States Patent
Iovane et al.

(10) Patent No.: US 9,387,456 B2
(45) Date of Patent: Jul. 12, 2016

(54) REACTOR FOR EXOTHERMIC OR ENDOTHERMIC CATALYTIC REACTIONS

(75) Inventors: Massimo Iovane, San Donato Milanese (IT); Roberto Zennaro, Milan (IT); Pio Forzatti, Monza (IT); Gianpiero Groppi, Segrate (IT); Luca Lietti, Cantu (IT); Enrico Tronconi, Arcore (IT); Carlo Giorgio Visconti, Basiglio (IT); Stefano Rossini, Milan (IT); Elsa Mignone, Monza (IT)

(73) Assignee: ENI S.p.A., Rome (IT)

( * ) Notice: Subject to any disclaimer, the term of this patent is extended or adjusted under 35 U.S.C. 154(b) by 384 days.

(21) Appl. No.: 13/319,930

(22) PCT Filed: May 10, 2010

(86) PCT No.: PCT/EP2010/002871
§ 371 (c)(1),
(2), (4) Date: Jan. 19, 2012

(87) PCT Pub. No.: WO2010/130399
PCT Pub. Date: Nov. 18, 2010

(65) Prior Publication Data
US 2012/0184631 A1    Jul. 19, 2012

(30) Foreign Application Priority Data
May 13, 2009   (IT) .............. MI2009A0826

(51) Int. Cl.
*B01J 8/00* (2006.01)
*B01J 8/02* (2006.01)
*B01J 19/00* (2006.01)
*B01J 19/24* (2006.01)
*B01J 19/30* (2006.01)
*B01J 19/32* (2006.01)
*C10G 2/00* (2006.01)
*B01J 8/06* (2006.01)
*B01J 20/28* (2006.01)
*B01J 35/00* (2006.01)
*B01J 35/02* (2006.01)
*B01J 35/04* (2006.01)

(52) U.S. Cl.
CPC .............. *B01J 19/2485* (2013.01); *B01J 8/067* (2013.01); *C10G 2/341* (2013.01); *B01J 2219/243* (2013.01); *B01J 2219/2428* (2013.01); *B01J 2219/2434* (2013.01); *B01J 2219/2445* (2013.01); *B01J 2219/2446* (2013.01); *B01J 2219/32296* (2013.01); *B01J 2219/32408* (2013.01); *B01J 2219/32466* (2013.01)

(58) Field of Classification Search
CPC .......... B01J 19/00; B01J 21/04; B01J 21/063; B01J 8/00; B01J 219/0006; B01J 19/24; B01J 19/0013; B01J 19/0093; B01J 19/00094; B01J 35/04; B01J 2523/00; B01J 35/023; B01J 19/2485; B01J 2523/15; B01J 2523/41; B01J 2523/68; B01J 2523/51; B01J 8/001; B01J 8/0015; B01J 8/0065; B01J 8/02; B01J 8/0292; B01J 8/08; B01J 8/12; B01J 8/18; B01J 8/1845; B01J 8/1881; B01J 8/24; B01J 8/34; B01J 19/248; B01J 19/30; B01J 19/305; B01J 19/32; B01J 19/325; B01J 20/28; B01J 20/28014; B01J 20/28042; B01J 20/28045; B01J 20/30; B01J 20/3092; B01J 35/00; B01J 35/02; B01J 35/28; B01J 35/28014; B01J 35/28043; B01J 2219/00; B01J 2219/00781; B01J 2219/00783; B01J 2219/0079; B01J 2219/00819; B01J 2219/00849; B01J 2219/24; B01J 2219/2401; B01J 2219/2402; B01J 2219/2408; B01J 2219/2411; B01J 2219/2412; B01J 2219/2422; B01J 2219/2424; B01J 2219/2425; B01J 2219/2427; B01J 2219/2428; B01J 2219/243; B01J 2219/2432; B01J 2219/2433; B01J 2219/2434; B01J 2219/2441; B01J 2219/2449; B01J 2219/30; B01J 2219/32; B01J 2219/322; B01J 2219/32296; B01J 2219/33; B01J 2220/80; B01J 2220/82; B01J 8/06; B01J 8/067; B01D 53/62; B01D 2257/504; B01D 2255/1021; B01D 53/944; B01D 2255/20738; B01D 39/14; B01D 39/20; C10G 2/00; C10G 2/30; C10G 2/32; C10G 2/34; C10G 2/341
USPC ......... 422/129, 168, 177–181, 187, 211, 198; 518/700, 712–721
See application file for complete search history.

(56) References Cited

U.S. PATENT DOCUMENTS

| | | | |
|---|---|---|---|
| 3,957,619 | A | 5/1976 | Chun et al. |
| 4,101,287 | A | 7/1978 | Sweed et al. |
| 4,378,336 | A | 3/1983 | Yoon |
| 6,211,255 | B1 | 4/2001 | Schanke et al. |

| | | | | |
|---|---|---|---|---|
| 6,593,377 | B1 * | 7/2003 | Harford et al. | 518/706 |
| 2002/0038066 | A1 | 3/2002 | Strangio et al. | |
| 2003/0012711 | A1 * | 1/2003 | Harkins et al. | 422/190 |
| 2003/0100448 | A1 * | 5/2003 | Cutler | B01J 19/2485 502/345 |
| 2004/0102530 | A1 * | 5/2004 | Borsa et al. | 518/704 |
| 2005/0142049 | A1 * | 6/2005 | Amsden et al. | 422/219 |
| 2006/0039843 | A1 * | 2/2006 | Patchett et al. | 423/239.1 |
| 2008/0138644 | A1 * | 6/2008 | Abbott, III et al. | 428/593 |
| 2009/0184293 | A1 * | 7/2009 | Han | C01B 3/382 252/373 |
| 2010/0310436 | A1 * | 12/2010 | Schellen et al. | 422/198 |

FOREIGN PATENT DOCUMENTS

| | | |
|---|---|---|
| GB | 2 322 633 | 9/1998 |
| WO | WO 2007/047922 A1 * | 7/2007 |

OTHER PUBLICATIONS

Post et al., Diffusion Limitations in Fischer-Tropsch Catalysts, Jul. 1989, AlChE Journal, vol. 35, No. 7, pp. 1107-1114.*

Mesheryakov et al., A multifunctional reactor with a regular catalyst packing for Fischer-Tropsch synthesis, Chemical Engineering Science 54 (1999), 1565-1570.*

International Search Report Issued Sep. 6, 2010 in PCT/EP10/002871 Filed May 10, 2010.

* cited by examiner

*Primary Examiner* — Natasha Young

(74) *Attorney, Agent, or Firm* — Oblon, McClelland, Maier & Neustadt, L.L.P

(57) ABSTRACT

Reactor for Fischer-Tropsch reaction which is carried out in a three-phase system essentially consisting of a reacting gaseous phase, a reacted liquid phase and a solid catalytic phase, wherein the solid catalytic phase consists of packed or structured bodies of catalytic material encaged within at least one honeycomb monolithic structure with a high thermal conductivity.

18 Claims, 3 Drawing Sheets

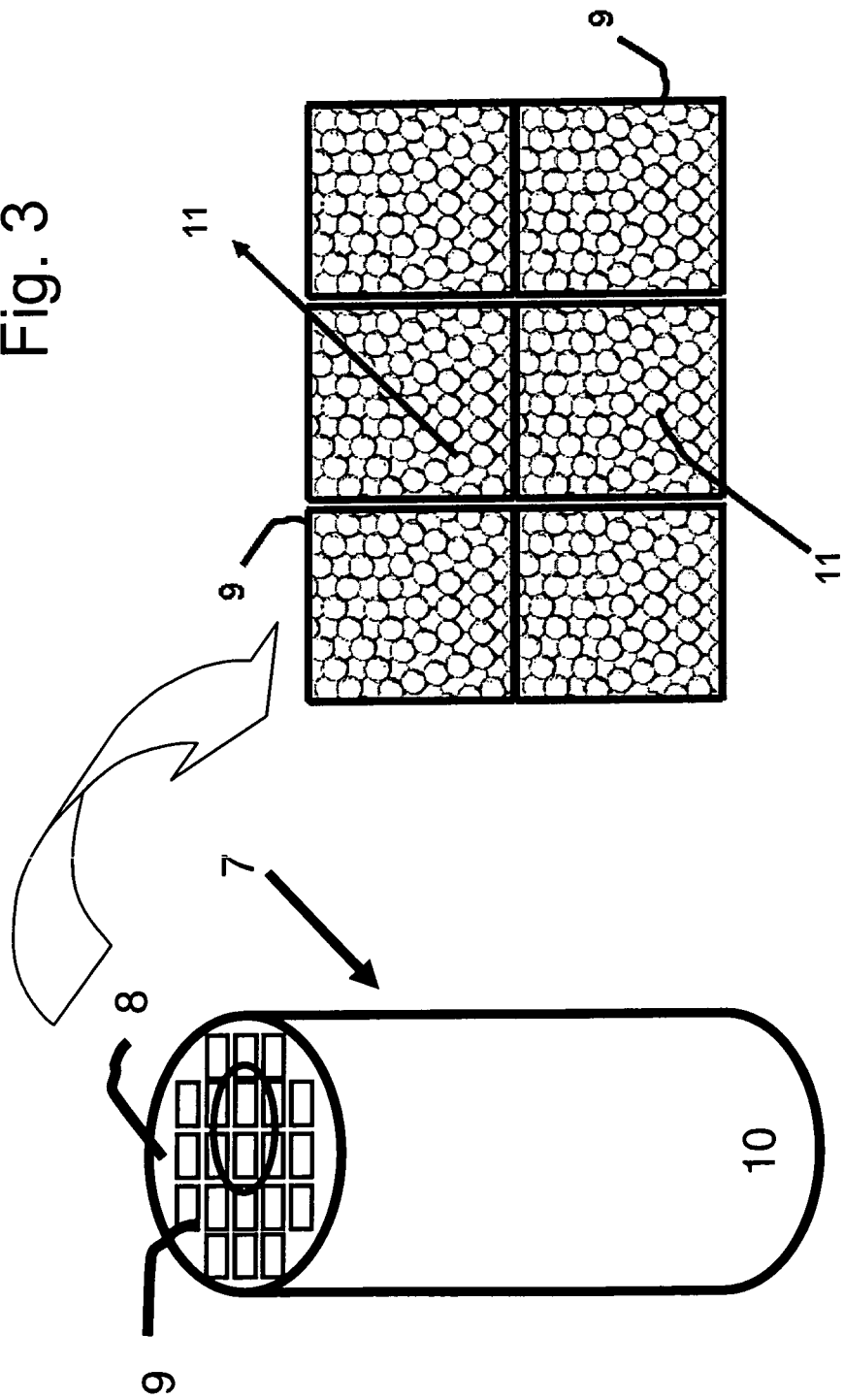

REACTOR FOR EXOTHERMIC OR ENDOTHERMIC CATALYTIC REACTIONS

Figure 1:
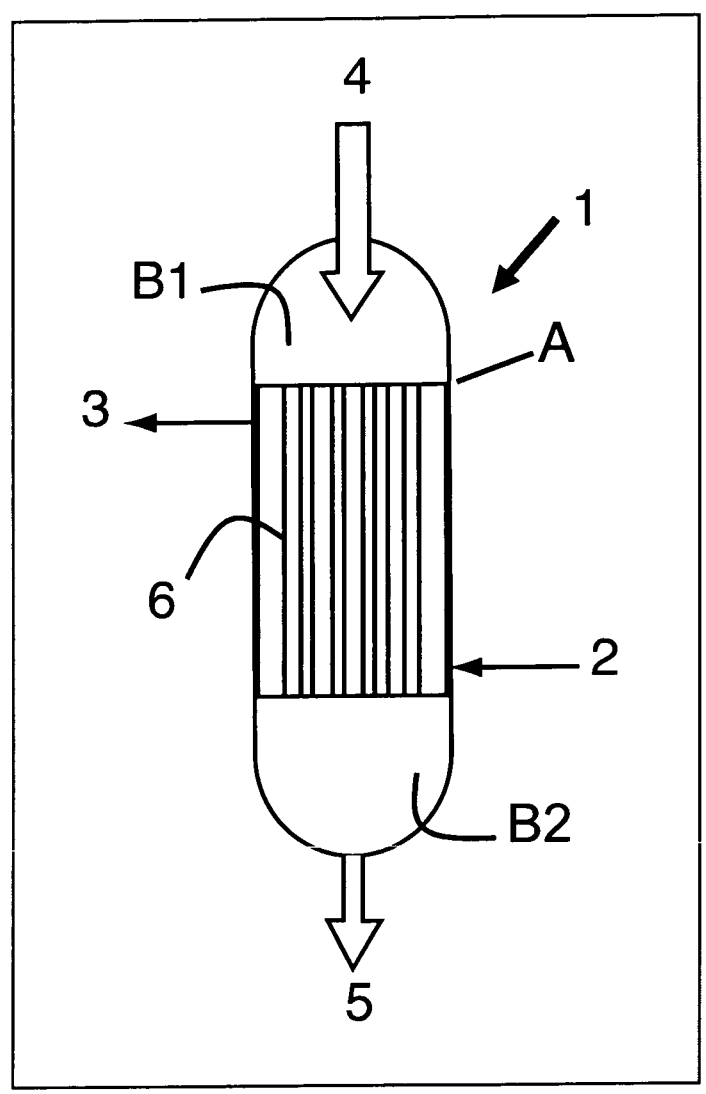

The present invention relates to a reactor for exothermic or endothermic catalytic reactions.

More specifically, the present invention relates to a reactor for exothermic or endothermic catalytic reactions, also multiphase.

Even more specifically, the present invention relates to a reactor for Fischer-Tropsch reaction.

In the present text, all the information and operative and non-operative conditions mentioned should be intended as preferred, even when not expressly indicated.

As is known, a Fischer-Tropsch reaction is a chemical reaction which proceeds in substantially three-phase systems in which a gaseous phase flows in contact with a solid catalyst, the reaction product mainly consisting of liquid and gaseous hydrocarbons. In particular, the reacting gaseous phase is a mixture of hydrogen and carbon monoxide (synthesis gas), with a $H_2/CO$ molar ratio ranging from 1 to 3, the liquid phase essentially consisting of linear hydrocarbons (paraffin waxes) with a high number of carbon atoms, the solid phase being represented by the catalyst.

The exothermic nature of Fischer-Tropsch reaction (35-45 kcal/mol) makes it necessary to adopt thermal exchange devices for the temperature control within the operative limits of the reaction, and to prevent the formation of local "hot spots" responsible for the deterioration of the catalyst.

International patent application WO 2008/074496, for example, proposes to carry out the Fischer-Tropsch reaction in reactors defined as "Slurry Bubble Column" in which the Fischer-Tropsch reaction proceeds in three-phase systems in which the synthesis gas gurgles, in the form of bubbles, in a catalyst suspension in the reaction liquid. The reaction system, continuously stirred by the ascending gas flow, allows the reaction heat to be easily removed by means of a thermal exchange tube system, immersed in the liquid, in which a cooling fluid circulates, for example water.

Even if "Slurry Bubble Column" reactors allow extremely favourable reaction yields to be obtained together with an effective temperature control, they have a series of operative problems. First of all, the reaction product must be separated from the catalyst: a suspension of catalyst in the reaction liquid is collected from the reactor, making it necessary to effect a separation step, either inside or outside the reactor itself.

Secondly, the reaction system must be run under appropriate fluid dynamic conditions, in order to have a homogeneous dispersion of the catalyst.

Finally, last-generation industrial reactors for the Fischer-Tropsch synthesis, in particular those which adopt the "Slurry Bubble Column" technology, have large dimensions. There can be cylindrical constructions 60 meters high and with a diameter in the order of 10 meters, for example. The management of these reactors and in particular their maintenance, for example the maintenance of the tubes of the heat exchange device, can be difficult. The simple substitution of a damaged tube of the heat exchange device, in fact, in a reactor 40-60 metres high, or more, may be a not simple operation.

An alternative to "Slurry Bubble Column" reactors is represented by fixed bed reactors. These reactors essentially consist of a device including a casing or shell and a pair of upper and lower closing elements, in which there are normally feeding means of the reagents and means for discharging the reaction products. A plurality of tubes is inserted inside the shell, each filled with the catalyst, in the form of pellets, for example.

The reagent gas, for example synthesis gas, flows inside the tubes, comes into contact with the catalytic particles and reacts.

The reaction heat is removed by a continuous flow of a cooling fluid, for example water, which occupies the free volume inside the shell.

The main limits of the fixed bed configuration substantially depend on the intraparticle mass transfer resistance (responsible, for example, for a low activity and selectivity towards the liquid product, in the case of Fischer-Tropsch reaction) and radial heat transfer inside the reactor (which can generate local "hot spots" with a potential deactivation of part of the catalyst). Furthermore, pressure drops, even considerably high, can also occur, depending on how the fixed bed is structured and, in particular, on the ratio between the height and diameter of the tubes and the dimensions of the catalyst particles. In conclusion, fixed bed reactors are characterized by a very low specific productivity (per unit of volume of the catalyst used), and for this reason, in order to increase it, particularly high quantities of catalyst must be used and therefore large reactor dimensions.

An alternative solution to traditional fixed bed or slurry bubble reactors is represented by multi-tubular reactors with monolithic catalysts. An example of this solution can be found in the published US patent application 2005/0142049 A1.

According to what is described in this patent application, exothermic reactions, such as the selective catalytic oxidation of benzene or n-butane to maleic anhydride, the oxidation of o-xylene to phthalic anhydride, or the Fischer-Tropsch synthesis, or endothermic reactions, such as the steam reforming of hydrocarbons to synthesis gas ($H_2$ and CO) can be carried out in multi-tubular reactors loaded with conductive monolithic catalysts. These reactors comprise a vessel inside which a plurality of tubes are placed. Each tube of the tube bundle incorporates the catalyst consisting of a metallic monolithic honeycomb structure which supports the catalyst.

The monolithic structure included in each tube consists of a continuous cylindrical body inside which there is a plurality of parallel channels. These monolithic structures are also described, for example, in U.S. Pat. No. 6,881,703.

The catalytic material is distributed on the internal walls of the monolith channels by means of the "washcoating" technique, so as to be in contact with the reagents flowing in each channel of the monolith.

The monolithic structure guarantees a good heat exchange with the thermo-regulation fluid circulating in the vessel outside the tubes, as the material of the monolith, being characterized by a good thermal conductivity, favours the radial transfer of heat.

The limit of multi-tubular reactors with "washcoated" monolithic catalysts, lies in the fact that the availability of catalytic active phase per unit of volume of the reactor is smaller than that of traditional reactors. For this reason, the reaction volumes must be increased in order to have an appreciable productivity.

The Applicant has now found that the solution to the above problems can be to avail of a reactor having smaller dimensions thanks to a higher volumetric density of the active phase of the catalyst and a more efficient system for the removal of the reaction heat. The reactors of the present invention therefore have smaller dimensions with respect to traditional reactors or reactors of the known art. This characteristic allows the reactors described in the present invention, to be positioned onboard ships and/or on specific land transportation vehicles to be transported to remote positions, where there are sources of raw materials for synthesis gas, for example offshore and/ or onshore natural gas fields, for which the use of large-sized reactors, such as fixed bed "Slurry Bubble Column" reactors, fixed bed reactors or multi-tubular reactors loaded with conventional monolithic catalysts, is not convenient or possible.

An object of the present invention therefore relates to a reactor for exothermic or endothermic chemical reactions, in the presence of a catalyst, for example a reactor for Fischer-Tropsch reaction, wherein the catalyst consists of packed bodies (for example, spheres, cylinders, rings, etc.) or structured bodies (for example, foams, gauzes, wires, etc.) which are loaded and encaged in a plurality of elements having a monolithic structure, with a high thermal conductivity, capable of favouring the reaction heat transfer to/from a refrigerating/heating fluid circulating inside the reactor jacket and in which the monolithic structures are immersed.

More specifically, an object of the present invention relates to a reactor for exothermic/endothermic chemical reactions in the presence of a catalyst, preferably solid, comprising:

a. a substantially cylindrical vessel equipped with feeding and discharge means of a thermoregulation fluid of the chemical reaction;
b. an upper closing element and a lower closing element respectively positioned at the top and at the bottom of the vessel;
c. feeding means of the reagent gaseous phase positioned in the upper closing element and/or in the lower closing element;
d. discharge means of the reacted phase positioned in the upper closing element and/or in the lower closing element;
e. a plurality of monolithic structures, as such or coaxially inserted inside tubular structures, arranged inside the vessel (a) between the upper closing element and the lower closing element, each monolithic structure consisting of a substantially cylindrical body inside which there is a plurality of parallel axial channels which extend from one end to the other, suitable for being filled with the catalyst.

The reactor object of the present invention is particularly and preferably suitable for the Fischer-Tropsch reaction which develops in a three-phase system, essentially consisting of a reagent gaseous phase, a reacted liquid phase and a solid catalytic phase consisting of packed bodies (for example, spheres, cylinders, rings, etc.) or structured bodies (for example, foams, gauzes, wires, etc.) inserted inside the channels of the monolith structure.

According to the present invention, the vessel is substantially cylindrical and can have any dimension but is preferably characterized by a height ranging, for example, from 1 to 10 m and a diameter ranging from 1 to 5 m. The substantially cylindrical vessel and the upper and lower closing elements are normally made of carbon steel, corrosion-resistant steel or consist of steel bound to metals selected from those of Groups 5-10, such as vanadium, niobium, chromium, molybdenum, tungsten, manganese, nickel, etc. The thicknesses of the body wall depend on the temperature and pressure at which the reaction takes place, but can generally range from 20 to 100 mm. The reactor, object of the present invention, can be arranged either vertically or horizontally.

The plurality of monolithic structures is inserted inside the substantially cylindrical vessel, as such or inserted inside tubular structures. These monolithic structures are in the form of a tube bundle, distanced between each other, inserted inside the cylindrical vessel and immersed in the thermoregulation liquid of the reaction temperature, for example water, in the case of exothermic reactions, or diathermic oil in the case of endothermic reactions.

The bundle has a diameter substantially equal to the inner diameter of the cylindrical container (a), or slightly smaller, and occupies a volume of between 50 and 900 of the total volume of the body (a), preferably between 60 and 80%. The bundle comprises a number of monolithic structures varying from 10 to 20,000, preferably from 100 to 10,000, more preferably from 1,000 to 8,000.

Each monolithic structure consists of a substantially cylindrical body, having a diameter ranging from 1 to 10 cm, having a continuous honeycomb structure, thermally connected, which, in the operating phase, allows the reaction heat to be disposed of, in the case of exothermic reaction, or to receive heat, in the case of endothermic reaction, with a high radial heat exchange coefficient. The continuous honeycomb monolithic structure therefore appears as a plurality of longitudinal channels, with a cross section, preferably in the form of a square or a rectangular with a side length of 0.5 to 5 mm, immersed in a continuous body. The cross section of the longitudinal channels of the monolithic structure is not necessarily square or rectangular. Polygonal sections can also be obtained, as well as circular, semi-circular and elliptic or with a more complex form.

The monolithic structure, object of the present invention, does not act as a carrier of the catalyst, but must favour the efficient removal of the reaction heat. For this reason, it is made of a material having an intrinsic heat conductivity of over 10 W/m/K, preferably ranging from 100 to 400 W/m/K. For dimensional stability at the reaction temperatures, the material is selected from metals such as steel, of the same type as the cylindrical body, aluminium, aluminium alloy or copper. The metal is preferably aluminium or an aluminium alloy. Alternatively, thermally conductive ceramic materials can be used, such as silicon carbide.

An example of the preparation of a monolithic structure according to the present invention is provided in U.S. Pat. No. 6,881,703, or in the international patent application WO 2005/011889.

The catalyst, in the form of packed bodies (for example, spheres, cylinders, rings, etc.) or structured bodies (for example, rigid foams, gauzes, wires, etc.), is positioned inside each channel of the monolithic structure, so as to fill the volume for a filling factor, catalyst Volume/Volume of the longitudinal channel, ranging from 0.2 to 0.8. With this arrangement of the catalyst, an optimum compromise can be obtained between the pressure drops of the flows along the reactor, the availability of suitable quantities of catalyst per volume unit of the reactor and an efficient removal of the reaction heat, thanks to the continuous, conductive monolithic structure.

The reactor, object of the present invention can be used, in particular, for exothermic catalytic reactions, such as Fischer-Tropsch reaction, wherein a gaseous reagent phase, consisting of a mixture of CO and $H_2$ (synthesis gas), flows coming in contact with a substantially fixed bed of catalyst, for example granules, forming a liquid/vapour phase, at the reaction temperature and pressure, consisting of paraffin waxes.

In particular, the reactor for reactions of the Fischer-Tropsch type is a reactor in which chemical reactions take place, which develop in three-phase systems, wherein a gaseous/vapour phase flows in contact with the solid phase and generates a vapour phase and a liquid phase which wets the catalyst. In this case, the gaseous/vapour phase essentially consists of synthesis gas and light reaction products, the vapour/liquid phase is the heavy reaction product, i.e. hydrocarbons essentially with a high number of carbon atoms, and the solid phase is represented by the catalyst.

The synthesis gas preferably comes from the steam reforming and/or partial oxygenation of natural gas or other hydrocarbons, on the basis of the reactions described, for example, in U.S. Pat. No. 5,645,613. Alternatively, the synthesis gas can come from other production techniques, such as, for example, from autothermal reforming, CPO (Catalytic Partial Oxidation) or from the gasification of coal, or other carbonaceous products, with high-temperature water vapour as described in "Catalysis Science and Technology", vol. 1 Springer-Verlag. New York, 1981.

Two phases are substantially produced by the Fischer-Tropsch reaction, a lighter vapour phase, essentially consisting of a mixture of light hydrocarbons, with a number of carbon atoms ranging from 1 to 25 and a boiling point at atmospheric pressure, for the $C_5$-$C_{25}$ fraction, equal to or lower than about 150° C., and reaction by-products, such as water vapour, $CO_2$, alcohols, etc.

The second phase produced essentially consists of paraffinic waxes, liquid at the reaction temperature, comprising mixtures of linear, branched hydrocarbons, saturated and unsaturated hydrocarbons with a high number of carbon atoms. These are generally hydrocarbon mixtures which have a boiling point, at atmospheric pressure, higher than 150° C., for example between 160 and 380° C.

The Fischer-Tropsch reaction is carried out at temperatures equal to or higher than 150° C., for example ranging from 200 to 350° C., maintaining a pressure ranging from 0.5 to 30 MPa inside the reactor. More significant details on the Fischer-Tropsch reaction can be found in "Catalysis Science and Technology" mentioned above.

The catalyst is generally based on cobalt or iron supported on an inert solid. The catalyst, which is preferably adapted to the reactor according to the present invention, is based on cobalt dispersed on a solid carrier consisting of at least one oxide selected from one or more of the following elements Si, Ti, Al, Zr, Mg. Preferred carriers are silica, alumina or titania.

The cobalt is present in the catalyst in quantities ranging from 1 to 50% by weight, generally from 5 to 35%, with respect to the total weight. The catalyst used, moreover, can comprise further additional elements. It can comprise, for example, with respect to the total weight, from 0.05 to 5% by weight, preferably from 0.1 to 3%, of ruthenium and from 0.05 to 5% by weight, preferably from 0.1 to 3%, of at least a third element selected from those belonging to group 3 (IUPAC regulation). Catalysts of this type are known in literature and described, together with their preparation, in European patent 756,895.

Further examples of catalysts are again based on cobalt but containing tantalum, as promoter element, in quantities of 0.05-5% by weight, with respect to the total weight, preferably 0.1-3%. These catalysts are prepared beforehand by depositing a cobalt salt on the inert carrier (silica or alumina), for example by means of the wet impregnation technique, followed by a calcination step and, optionally, a reduction and passivation step of the calcined product.

A derivative of tantalum (particularly tantalum alcoholates) is deposited on the catalytic precursor thus obtained, preferably with the wet impregnation technique followed by calcination and, optionally, reduction and passivation.

Whatever its chemical composition may be, the catalyst is used in structured or particle form, for example of spherical granules with an average dimension of less than 3 mm, preferably from 0.3 to 1 mm.

For a better understanding of the reactor for exothermic/endothermic chemical reactions, object of the present invention, reference will be made to the drawings of the enclosed Figure which represent an illustrative and non-limiting embodiment. In particular, drawing 1 of the Figure schematically represents a longitudinal section of the reactor whereas drawings 2 and 3 represent the details of one of the monolithic structures situated in its interior and the catalyst present therein.

According to the Figure, the reactor 1 essentially consists of a cylindrical vessel A and two closing elements B1 and B2. The cylindrical body A is equipped with an inlet (2) and outlet (3) of the thermoregulation fluid of the chemical reaction involved, whereas the closing elements B1 and B2 are equipped with an inlet (4) and/or outlet (5) of the reagents and reaction products. Alternatively, the inlet and outlet can be inverted.

Figure 2:
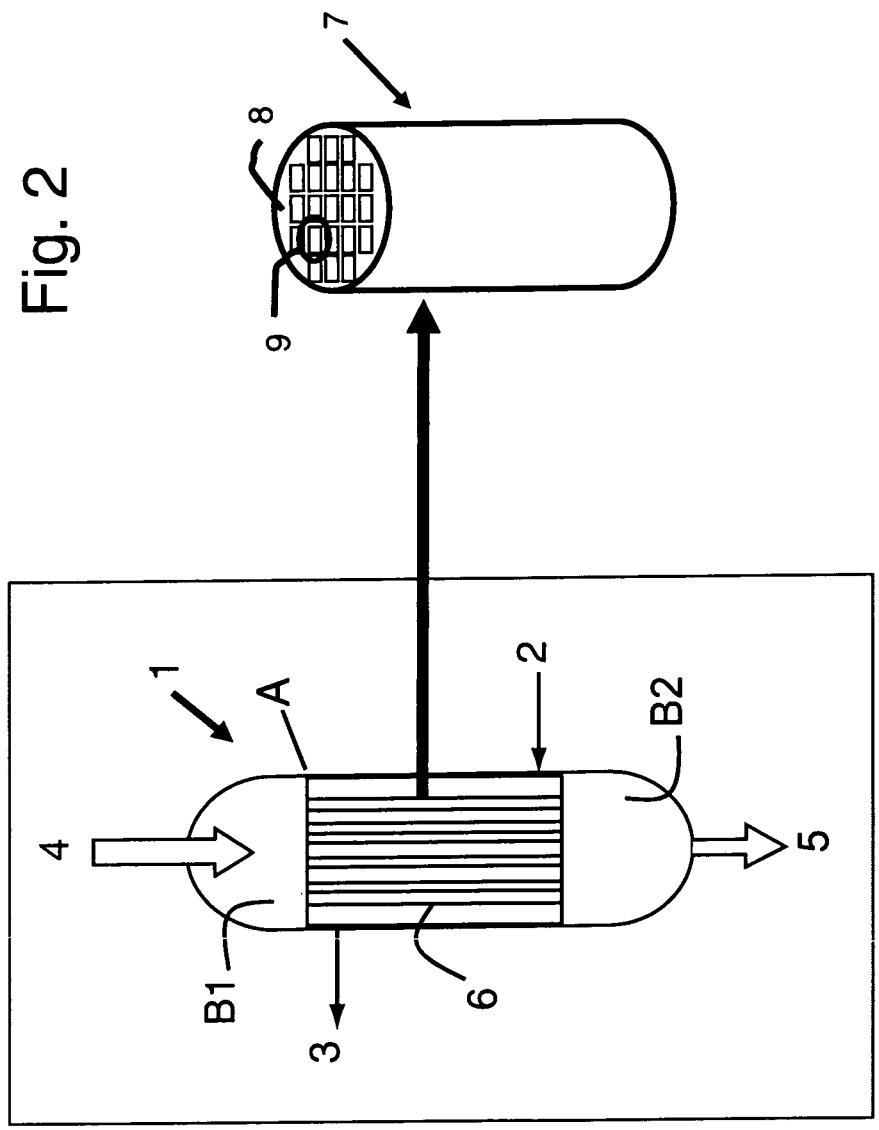

The bundle (6) of monolithic structures is situated inside the cylindrical vessel A, whose details can be seen in the drawing of FIG. 2. Each monolithic structure (7) consists of a cylindrical body (8) whose interior comprises a plurality of channels (9) immersed in the continuous body (10). The catalyst, for example in the form of a bed (11) packed with granules, is arranged inside the channels, as shown in the drawing of FIG. 3.

The functioning of the reactor, for example for the Fischer-Tropsch exothermic reaction, is clear from the above description and drawings. Once the catalyst (11) has been charged into the monolithic structures, synthesis gas is fed, for example through the inlet duct (4). As they flow inside the channels filled with the monolithic structures, the reagent gases come into contact with the catalyst and react forming the vapour/liquid phase, essentially consisting of high-molecular weight paraffinic waxes. The reaction product is discharged through the outlet duct (5) together with the reaction by-products, hydrocarbon gases/vapours and non-reacted reagents. During the reaction, there is the production of heat which is removed by a cooling fluid fed and discharged through (2) and (3). Thanks to the monolithic structure and thermally conductive material of which the monoliths are made, the reaction heat is transferred by conduction to the cooling fluid with a higher efficiency with respect to the case of a traditional fixed bed reactor.

In order to demonstrate the improved heat exchange efficiency and enhanced productivity associated with the present invention, an applicative example is provided hereunder for the sole purpose of representing but not limiting the invention.

EXAMPLE

A monotubular reactor, cooled externally, is first considered, consisting of a honeycomb monolith with square channels 1 metre long, made of aluminium, having an external diameter equal to 25.4 mm and a cell density of 4 cells per square centimetre.

The channels of this monolith, having a vacuum void fraction equal to 0.57, were coated (by washcoating) with a layer of catalyst for the Fischer-Tropsch synthesis, based on cobalt supported on alumina, having a thickness equal to 50 μm.

The reactor operates with a pressure at the head equal to 20 bar, feeding 5,000 $Ncm^3/h/g_{cat}$ of a mixture of CO and $H_2$ preheated to 235° C. and having a ratio between the two species equal to 2.1 moles of $H_2$ per mole of CO. The cooling fluid is kept at a constant temperature of 235° C.

The total specific productivity of this reactor is equal to 35 kg/h/m³ and the pressure drop is negligible. The temperature profile of the monolith is practically flat and differs from the temperature of the cooling fluid by less than 2° C. (Tmax=237° C.)

The same monotubular reactor, cooled externally, is then considered, consisting of a honeycomb monolith with square channels 1 metre long, made of aluminium, having an external diameter equal to 25.4 mm and a cell density of 4 cells per square centimetre. In this case, however, the channels of the monolith are filled with catalytic particles packed with cobalt supported on alumina having an external diameter of 500 μm.

The reactor operates with a pressure at the head equal to 20 bar, feeding 5,000 Ncm$^3$/h/g$_{cat}$ of a mixture of CO and H$_2$ preheated to 228° C. and having a ratio between the two species equal to 2.1 moles of H$_2$ per mole of CO. The cooling fluid is kept at a constant temperature of 228° C.

The total specific productivity of this reactor is equal to 264 kg/h/m$^3$ and the pressure drop, slightly higher than those of the previous case, is still acceptable, being equal to 0.76 bar. The temperature profile of the monolith, although being more marked than the previous profile, also has a temperature difference again remaining below 3° C. and differs from the temperature of the cooling fluid by not more than 11° C. (Tmax=239° C.).

The invention claimed is:

1. A reactor comprising:
    a substantially cylindrical vessel having feeding and discharge means of a thermoregulation fluid of a chemical reaction;
    an upper closing element and a lower closing element respectively positioned at a top and at a bottom of the substantially cylindrical vessel;
    feeding means of a reagent gaseous phase positioned in the upper closing element, the lower closing element or both;
    discharge means of a reacted phase positioned in the upper closing element, the lower closing element or both; and
    a plurality of honeycomb monolithic structures, optionally coaxially inserted inside tubular structures, inserted inside the substantially cylindrical vessel between the upper closing element and the lower closing element, each monolithic structure consisting of a substantially cylindrical continuous body having a diameter from 1 to 10 cm inside which there is a series of parallel axial channels, tubes, or both channels and tubes with a square or rectangular cross section with a side length of from 0.5 to 5 mm, which extends from one end to the other, separated by continuous honeycomb matrix, and filled with a catalyst in structured or particle form with an average dimension of from 0.3 mm to less than 3 mm positioned inside each channel, so as to fill the volume for a filling factor, (catalyst(volume)/(volume of the longitudinal channel), ranging from 0.2 to 0.8,
    wherein the reactor is suitable for exothermic, endothermic, or both exothermic and endothermic reaction in the presence of the catalyst,
    and
    wherein the plurality of honeycomb monolithic structures is made of a material having an intrinsic thermal conductivity higher than 10 W/m /K.

2. The reactor according to claim 1, wherein the reactor is arranged vertically or horizontally.

3. The reactor according to claim 1, wherein a series of monolithic structures forms a bundle having a diameter which is substantially equal to an internal diameter of the substantially cylindrical vessel, or slightly less, and occupies a volume ranging from 50 to 90% of a total volume of the substantially cylindrical vessel.

4. The reactor according to claim 3, wherein the bundle comprises from 10 to 20,000 monolithic structures.

5. The reactor according to claim 1, wherein the plurality of honeycomb monolithic structures appears as a series of longitudinal channels, with a square or rectangular cross section having a length of sides ranging from 0.5 to 5 mm, immersed in a continuous body.

6. The reactor according to claim 1, wherein the catalyst is solid.

7. The reactor according to claim 1, wherein the catalyst comprises cobalt or iron supported on an inert solid.

8. The reactor according to claim 1, wherein the catalyst comprises cobalt dispersed on a solid carrier consisting of at least one oxide of one or more of the following elements Si, Ti, Al, Zr, Mg.

9. The reactor according to claim 8, wherein the solid carrier is silica, alumina or titania.

10. The reactor according to claim 1, wherein the catalyst is in the form of granules.

11. The reactor according to claim 1, wherein the catalyst is in the form of spherical granules.

12. The reactor according to claim 1, wherein the catalyst is in the form of spherical granules with an average dimension of 0.3 mm to 1 mm.

13. The reactor according to claim 1, wherein the plurality of honeycomb monolithic structures are coaxially inserted inside tubular structures.

14. The reactor according to claim 1, wherein the substantially cylindrical vessel has a height of from 1 to 10 m.

15. The reactor according to claim 14, wherein the substantially cylindrical vessel has a diameter of from 1 to 5 m.

16. A process for carrying a catalytic reaction, the process comprising:
    feeding reagents to the reactor according to claim 1, wherein the catalytic reaction is an exothermic , endothermic, or both exothermic and endothermic catalytic reaction.

17. The process according to claim 16, wherein the catalytic reaction is a Fischer-Tropsch reaction.

18. The process according to claim 16, wherein the catalyst is a packed or structured body.

* * * * *